United States Patent [19]

Kobayashi

[11] Patent Number: 5,290,900

[45] Date of Patent: Mar. 1, 1994

[54] CURABLE FLUOROSILICONE RESIN COMPOSITION

[75] Inventor: Hideki Kobayashi, Ichihara, Japan

[73] Assignee: Dow Corning Toray Silicone, Ltd., Tokyo, Japan

[21] Appl. No.: 44,847

[22] Filed: Apr. 8, 1993

[30] Foreign Application Priority Data

Apr. 27, 1992 [JP] Japan .................. 4-134214
May 27, 1992 [JP] Japan .................. 4-160411

[51] Int. Cl.$^5$ ............ C08G 77/14; C08G 77/34; C08G 77/26

[52] U.S. Cl. ............ 528/26; 528/38; 528/36; 528/42; 528/40; 528/34; 525/474; 525/477

[58] Field of Search .......... 528/38, 36, 42, 25, 528/40, 34; 525/474, 477

[56] References Cited

U.S. PATENT DOCUMENTS

| | | | |
|---|---|---|---|
| 2,728,743 | 12/1955 | Warrick | 528/42 |
| 3,433,780 | 3/1969 | Akada, Jr. et al. | 525/477 |
| 3,453,232 | 7/1969 | Larson | 260/46.5 |
| 3,560,436 | 2/1971 | Szendrey | 528/42 |
| 3,839,280 | 10/1974 | Zdaniewski | 528/42 |
| 4,024,306 | 5/1977 | Takamizawa | 427/387 |
| 4,549,003 | 10/1985 | Lim et al. | 528/42 |
| 5,178,959 | 1/1993 | Eckberg et al. | 428/447 |

FOREIGN PATENT DOCUMENTS

| | | |
|---|---|---|
| 55-048245 | 4/1980 | Japan . |
| 59-140280 | 8/1984 | Japan . |
| 2067212 | 7/1981 | United Kingdom . |

*Primary Examiner*—John C. Bleutge
*Assistant Examiner*—Margaret W. Glass
*Attorney, Agent, or Firm*—Alexander Weitz

[57] ABSTRACT

A curable fluorosilicone resin composition is disclosed, which composition comprises (A) 100 parts by weight of a fluorosilicone resin obtained by cohydrolyzing a mixture of
  (a) 50 to 95 mole percent of a perfluoroalkyl-containing organosilane having the formula R—CH$_2$CH$_2$SiX$_3$,
  (b) 5 to 50 mole percent of an epoxy-containing organosilane having the formula Z$_w$SiX$_{4-w}$ and, optionally,
  (c) up to 50 mole percent of an organosilane having the formula R$^1{}_n$SiX$_{4-n}$,
  wherein R is a perfluoroalkyl group containing 4 to 15 carbon atoms, X is a hydrolyzable group, Z is an epoxy-containing monovalent organic group, R$^1$ is hydrogen or a monovalent hydrocabon group containing 1 to 15 carbon atoms, w is 1, 2 or 3 and n is 0, 1, 2 or 3; and (B) 1 to 50 parts by weight of a crosslinking agent selected from the group consisting of
  (i) an amino group-containing organosilicon compound that contains at least 2 nitrogen-bonded active hydrogens in each molecule and
  (ii) a fluorine compound that contains at least 2 carboxyl groups and at least 2 fluorine atoms in each molecule.

When cured, the composition provides a film that is both highly water repellent and highly oil repellent.

9 Claims, No Drawings

CURABLE FLUOROSILICONE RESIN COMPOSITION

FIELD OF THE INVENTION

The present invention relates to a curable fluorosilicone resin composition, and specifically relates to a curable fluorosilicone resin composition that has an excellent water repellency and an excellent oil repellency when cured.

BACKGROUND OF THE INVENTION

A great many organopolysiloxane resin-based compositions that cure to give a water-repellent film are already known. For example, Japanese Patent Application Laid Open Number Sho 55-48245 (48,245/1980) introduces a composition consisting of hydroxyl-containing methylpolysiloxane resin, alpha,omega-dihydroxydiorganopolysiloxane, and organosilane which cures to form a water-repellent cured film that has excellent release and anti-stain properties.

In addition, Japanese Patent Application Laid Open Number Sho 59-140280 (140,280/1984) introduces a composition that is based on the partial cohydrolysis condensation product of organosilane whose principal constituents are perfluoroalkyl-containing organosilane and amino-containing organosilane. The composition forms a cured film that has both an excellent water repellency and an excellent oil repellency.

However, although these compositions exhibit water repellency or both water repellency and oil repellency, they do not possess a high degree of water repellency and oil repellency with the result that they cannot be employed in applications that require higher degrees of both water repellency and oil repellency. The present inventor achieved the present invention as a result of research directed at solving this problem. That is, the present invention takes as its object the introduction of a fluorosilicone resin composition that cures to produce a cured film that has both an excellent water repellency and an excellent oil repellency.

SUMMARY OF THE INVENTION

The present invention therefore concerns a curable fluorosilicone resin composition comprising:
(A) 100 weight parts of fluorosilicone resin afforded by the cohydrolysis of a mixture composed of
  (a) 50 to 95 mole % perfluoroalkyl-containing organosilane with the general formula $$R-CH_2CH_2SiX_3$$

wherein R is a $C_4$ to $C_{15}$ perfluoroalkyl group and X represents a hydrolyzable atom or group,
  (b) 5 to 50 mole % of an epoxy-containing organosilane with the general formula $$Z_wSiX_{4-w}$$

wherein Z is an epoxy-containing monovalent organic group, X is defined as above, and w is 1, 2, or 3, and
  (c) 0 to 50 mole % of an organosilane with the general formula $$R^1{}_nSiX_{4-n}$$

wherein $R^1$ is the hydrogen atom or a $C_1$ to $C_{15}$ monovalent hydrocarbon group, X is defined as above, and n is 0, 1, 2, or 3; and
(B) 1 to 50 weight parts of a crosslinking agent selected from an amino group-containing organosilicon compound that contains at least 2 nitrogen-bonded active hydrogens in each molecule or a fluorine compound that contains at least two carboxyl groups and at least two fluorine atoms in each molecule.

DETAILED DESCRIPTION OF THE INVENTION

To explain the preceding in greater detail, the fluorosilicone resin comprising the component (A) used by the present invention forms the basis of the composition of the present invention. This fluorosilicone resin is afforded by the cohydrolysis of a mixture prepared from the 3 types of organosilanes specified above, i.e., a mixture of either components (a) and (b) or of components (a), (b), and (c). The perfluoroalkyl-containing organosilane comprising component (a) is the essential component for imparting water repellency, oil repellency, releasability, and a low surface tension to cured products from the composition of the present invention. R in the preceding formula represents perfluoroalkyl groups having 4 to 15 carbon atoms and is exemplified by $-C_4F_9$, $-C_6F_{13}$, $-C_8F_{17}$, $-C_{10}F_{21}$, and so forth. The perfluoroalkyl group may be straight chain or branched. X represents a hydrolyzable atom or group and may be exemplified by halogen atoms such as chlorine and bromine; alkoxy groups such as methoxy, ethoxy, and propoxy; acyloxy groups such as acetoxy; N,N-dialkylaminoxy groups; N-alkylamido groups; alkenoxy groups; and so forth, alkoxy being preferred. This component (a) should comprise 5 to 95 mole % of component (A).

The epoxy-containing organosilane comprising component (b) is the essential component for imparting curability and adherence to the composition of the present invention. With regard to the formula given above, Z is an epoxy-containing monovalent organic group, X is defined as above, and w is 1, 2, or 3. The epoxy-containing monovalent organic group is exemplified by 3-glycidoxypropyl, 2-(3,4-epoxycyclohexyl)ethyl, 3-(3,4-epoxycyclohexyl)propyl, and 3,4-epoxycyclohexyl. This component (b) should comprise 5 to 50 mole % of component (A).

The organosilane comprising component (c) is used on an optional basis chiefly to adjust the hardness and lower the cost of the composition of the present invention. With respect to the formula given above, $R^1$ represents hydrogen or a monovalent hydrocarbon group having 1 to 15 carbon atoms, X is defined as above, and n is 0, 1, 2, or 3. $R^1$ is exemplified by alkyl groups such as methyl, ethyl, tert-butyl, 2-ethylhexyl, and dodecyl; alkenyl groups such as vinyl and allyl; cycloalkyl groups such as cyclopentyl and cyclohexyl; cycloalkenyl groups such as cyclopentenyl and cyclohexenyl; aryl groups such as phenyl and naphthyl; aralkyl groups such as benzyl, phenylethyl, and xylyl; alkaryl groups such as tolyl and dimethylphenyl; and halogenated hydrocarbon groups such as chloromethyl, 3-chloropropyl, and 3,3,3-trifluoropropyl, methyl and vinyl being preferred. This component (c) should comprise zero to 50 mole % of component (A).

The fluorosilicone resin comprising the component (A) used by the present invention can be obtained by cohydrolyzing an organosilane mixture of components (a) and (b) or components (a), (b), and (c). A number of methods can be used for the cohydrolysis of this organosilane mixture. Two examples in this regard are as follows: (i) the addition with stirring of a small quantity of a condensation-reaction catalyst to a mixture of water, organic solvent, and the organosilane mixture as described above, or (ii) the addition with stirring of water and a small amount of condensation-reaction catalyst to the organosilane mixture. Catalysts known to accelerate the dehydrative condensation of silanol groups are effective as condensation-reaction catalysts for use in these methods. The condensation-reaction catalyst under consideration is nonexhaustively exemplified by tetraalkyl titanates such as tetra-n-butyl titanate; the complex salts of dialkyl titanates; organosiloxy titanates; the tin salts of carboxylic acids such dibutyltin acetate, dibutyltin laurate, dibutyltin dioctoate, tin(II) octoate, tin(II) naphthenate, tin(II) oleate, tin(II) isobutyrate, tin(II) linoleate, tin(II) stearate, tin(II) benzoate, tin(II) naphthoate, tin(II) laurate, tin(II) o-thymate, tin(II) beta-benzoylpropionate, tin(II) crotonate, tin(II) tropate, tin(II) p-bromobenzoate, tin(II) palmitooleate, tin(II) cinnamate, tin(II) phenylacetate, etc.; and the iron, manganese, and cobalt salts of such carboxylic acids. A condensation-reaction catalyst should be used that is suited to the types of hydrolyzable groups present in the organosilanes.

This cohydrolysis is advantageously carried out using an organic solvent. As the organic solvent, it is desirable to use organic solvent that dissolves the aforesaid organosilane mixture of components (a) through (c) as well as the fluorosilicone resin product. Such organic solvents are nonexhaustively exemplified by ethers such as diethyl ether, tetrahydrofuran, and so forth; ketones such as acetone, methyl isobutyl ketone, and so forth; halogenated hydrocarbons such as 1,1,1-trichloroethane, dichloroethane, alpha,alpha,alpha-trifluorotoluene, hexafluoroxylene, 1,1,2-trichlorotrifluoroethane, and so forth; and HCFC series solvents such as $CHCl_2CF_3$ and $CH_3CCl_2F$. The concentration in the organic solvent may be chosen arbitrarily, on the basis of workability, but ordinarily the concentration of the fluorosilicone resin product in the organic solvent is regulated to 10 to 80 weight %.

After an optional addition of either organic solvent or water to the fluorosilicone resin solution obtained by cohydrolysis of the organosilane mixture, the aqueous layer is separated after quiescence. The organic solvent layer containing the fluorosilicone resin is washed with water to neutrality. It is also advisable to carry out a water elimination step. When an organic solvent has been used in which water is sparingly soluble, this water elimination step may be run by azeotropic distillation of the organic solvent using a water separation tube. The resulting fluorosilicone resin generally contains 0.01 to 10 weight % silicon-bonded hydroxyl groups and preferably contains 0.05 to 5 weight % silicon-bonded hydroxyl groups.

The amino group-containing organosilicon compound which can comprise crosslinking agent (B) of the present invention acts as a crosslinker. In this case, the cured resin composition is generated by the reaction of the amino groups in component (B) with the epoxy groups present in the fluorosilicone resin comprising component (A). Each molecule of this organosilicon compound must therefore contain at least 2 nitrogen-bonded active hydrogens. In other words, this crosslinking agent molecule must contain at least 1 primary amino group or at least 2 secondary amino groups. The amino-containing compounds known as epoxy resin curing agents are generally not compatible with the fluorosilicone resin comprising the component (A) of the present invention. As a result, they fail to provide a satisfactory curability and cause cloudiness in the cured film and therefore cannot be used in the composition of the present invention. The organosilicon compound under consideration comprises amino-containing organosilanes and amino-containing organopolysiloxanes, and is specifically exemplified by 3-aminopropyltriethoxysilane, 3-aminopropyltrimethoxysilane, 3-(2'-aminoethyl)aminopropyltrimethoxysilane, 3-(2'-aminoethyl)aminopropylmethyldimethoxysilane, 1,3-di(3'-aminopropyl)tetramethyldisiloxane, and 3-aminopropyldimethylsiloxy-endblocked polydimethylsiloxane.

Alternatively, crosslinking agent (B) can comprise a fluorine compound which contains at least 2 carboxyl groups and at least 2 fluorine atoms per molecule. This component (B) is also a crosslinking agent that reacts with the epoxy groups in component (A) to produce the cured resin composition. The carboxyl groups in this fluorine compound react with the epoxy groups in component (A), and it is necessary that there be at least 2 per molecule to produce a crosslinked structure. Furthermore, for component (B) to be compatible with component (A), component (B) must have at least 2 fluorine atoms per molecule. The carboxyl-containing compounds known as epoxy resin curing agents are generally not compatible with the fluorosilicone resin comprising the component (A) of the present invention, and either they fail to provide sufficient curability or the cured film is cloudy. This crosslinking agent is specifically exemplified by tetrafluoroterephthalic acid ($C_6F_4(COOH)_2$), tetrafluorophthalic acid ($C_6F_4(COOH)_2$), tetrafluorosuccinic acid ($HOOC-C_2F_4-COOH$), octafluoroadipic acid ($HOOC-C_4F_8-COOH$), and their anhydrides. Furthermore, this component (B) may be a siloxane compound as long as it contains at least 2 carboxyl groups and at least 2 fluorine atoms in the molecule.

Component (B) is added at 1 to 50 weight parts per 100 weight parts component (A) and is selected from within the range in which the number of moles of epoxy groups in component (A) is approximately equivalent to the number of moles of nitrogen-bonded active hydrogens (i.e., amino active hydrogen), or number of moles of carboxyl groups, in component (B).

The composition of the present invention can be prepared simply by mixing component (A) and component (B) to homogeneity. The curable fluorosilicone resin composition of the present invention is preferably diluted with organic solvent (for example, when it is employed as a coating). Organic solvents operable for this purpose are nonexhaustively exemplified by ethers such as diethyl ether, tetrahydrofuran, and so forth; ketones such as methyl isobutyl ketone and so forth; halogenated hydrocarbons such as 1,1,1-trichloroethane, dichloroethane, alpha,alpha,alpha-trifluorotoluene, hexafluoroxylene, 1,1,2-trichlorotrifluoroethane, and the like; and HCFC series solvents such as $CHCl_2CF_3$ and $CH_3CCl_2F$. The dilution ratio is arbitrarily selected on the basis of workability.

In addition, in order to further improve adherence by the composition of the present invention for various types of materials, known silane coupling agents other than component (B) may be added to the composition of the present invention as adhesion promoters insofar as this does not interfere with the object of the present invention. Such a silane coupling agent should be added at approximately 0.01 to 10 weight % based on the composition of the present invention.

The curable fluorosilicone resin composition of the present invention can be applied to various substrates and cured at ambient temperature or by heating. The heating temperature is arbitrary when the cure is induced by heating, but is generally chosen from the range of 50° C. to 250° C.

The composition according to the present invention as described above cures to form a film that has an excellent water repellency and oil repellency or oleophobicity, but also an excellent stain resistance, heat resistance, weather resistance, and chemical resistance. It can therefore be used in those applications where such properties are critical. For example, it can be used for preventing the adherence of such things as water drops, snow, and ice, as an anti-stain coating, for nonstick or release coatings, and so on.

EXAMPLES

In the following, the present invention will be explained using examples. In the examples, part means weight part, and Me stands for the methyl group. The water repellency of the cured film was evaluated by measuring the water contact angle. The oil repellency was evaluated by measuring the n-hexadecane contact angle.

EXAMPLE 1

Into a flask were introduced 14.7 g of perfluoroalkyl-containing methoxysilane with the formula $C_4F_9CH_2CH_2Si(OMe)_3$, 2.4 g of 3-glycidoxypropyltrimethoxysilane, and 0.03 g of tetra-n-butyl titanate. This mixture was stirred at room temperature while dripping in a liquid mixture of 1.4 g of water and 10 g of methanol. After the completion of addition, stirring was continued overnight. The low boilers were then stripped off under reduced pressure to afford a fluorosilicone resin in the liquid state at room temperature. Fourteen grams of this fluorosilicone resin was dissolved in 15 g of tetrahydrofuran. Into this was then mixed 1.0 g of 1,3-di(3'-aminopropyl)tetramethyldisiloxane. A cured film was obtained by applying this liquid to the surface of an aluminum plate and heating for 1 hour at 150° C. The cured film had a 2 H pencil hardness. The contact angles of this cured film were measured. This measurement was carried out by the liquid drop method using a contact angle meter from Kyowa Kaimen Kagaku Kabushiki Kaisha, Japan, and the contact angle was taken as the average of the measurement values for 10 drops. The results were 111 degrees for the water contact angle and 68 degrees for the n-hexadecane contact angle.

EXAMPLE 2

Into a flask were introduced 16.6 g of perfluoroalkyl-containing methoxysilane with the formula $C_4F_9CH_2CH_2Si(OMe)_3$, 1.2 g of 3-glycidoxypropyltrimethoxysilane, 1 g of dimethyldimethoxysilane, and 0.03 g of tetra-n-butyl titanate. This mixture was stirred at room temperature while dripping in a liquid mixture of 3.8 g of water and 10 g of methanol. After the completion of addition, stirring was continued overnight. The low boilers were then stripped off under reduced pressure to yield a fluorosilicone resin in the liquid state at room temperature. Fourteen grams of this fluorosilicone resin was dissolved in 16 g of tetrahydrofuran. Into this was then mixed 0.6 g of 3-aminopropyltriethoxysilane. A cured film was obtained by applying this liquid to the surface of an aluminum plate and heating for 1 hour at 150° C. The contact angles of this cured film were as follows: 115 degrees for the water contact angle and 70 degrees for the n-hexadecane contact angle.

EXAMPLE 3

Into a flask were introduced 14.7 g of perfluoroalkyl-containing methoxysilane with the formula $C_4F_9CH_2CH_2Si(OMe)_3$, 2.6 g of 2-(3,4-epoxycyclohexyl)ethyltrimethoxysilane, 1 g of tetramethoxysilane, and 0.03 g of tetra-n-butyl titanate. This mixture was stirred at room temperature while dripping in a liquid mixture of 1.4 g of water and 10 g of methanol. After the completion of addition, stirring was continued overnight. The low boilers were then stripped off under reduced pressure to provide a fluorosilicone resin in the liquid state at room temperature. Fourteen grams of this fluorosilicone resin was dissolved in 15 g of tetrahydrofuran. Into this was then mixed 1.0 g of 1,3-di(3'-aminopropyl)tetramethyldisiloxane. A cured film was obtained by applying this liquid to the surface of an aluminum plate and heating for 1 hour at 150° C. The pencil hardness of this cured film was H. The contact angles of this cured film were measured with the following results: 110 degrees for the water contact angle and 66 degrees for the n-hexadecane contact angle.

EXAMPLE 4

Into a flask were introduced 14.7 g of organosilane with the formula $C_4F_9CH_2CH_2Si(OMe)_3$, 2.4 g of 3-glycidoxypropyltrimethoxysilane, and 0.03 g of tetra-n-butyl titanate. This mixture was stirred at room temperature while dripping in a liquid mixture of 1.8 g of water and 10 g of methanol. After the completion of addition, stirring was continued overnight. The methanol was then stripped off under reduced pressure. The obtained reaction product was a fluorosilicone resin in the liquid state at room temperature. Fourteen grams of this fluorosilicone resin was dissolved in 16 g of tetrahydrofuran. A curable fluorosilicone resin composition was then prepared by adding 1.5 g of octafluoroadipic acid and mixing. A transparent cured film was obtained by applying this liquid to the surface of an aluminum plate and heating for 1 hour at 150° C. The cured film had a 2 H pencil hardness. The contact angles of the cured film with respect to water and n-hexadecane were measured. The results were 115 degrees for the water contact angle and 75 degrees for the n-hexadecane contact angle.

EXAMPLE 5

Into a flask were introduced 16.6 g of organosilane with the formula $C_4F_9CH_2CH_2Si(OMe)_3$, 1 g of methyltrimethoxysilane, 1.2 g of 3-glycidoxypropyltrimethoxysilane, and 0.03 g of tetra-n-butyl titanate. This mixture was stirred at room temperature while dripping in a liquid mixture of 3.5 g of water and 10 g of methanol. After the completion of addition, stirring was continued overnight. The methanol was then stripped off under reduced pressure. The obtained reaction product was a fluorosilicone resin in the liquid state at room temperature. Fourteen grams of this fluorosilicone resin was dissolved in 16 g of tetrahydrofuran and 0.6 g of tetrafluorophthalic acid was mixed in. A transparent cured film was obtained by applying this liquid to the surface of an aluminum plate and heating for 1 hour at 150° C. The cured film had a 2H pencil hardness. The contact angles of this cured film were measured with the following results: 119 degrees for the water contact angle and 73 degrees for the n-hexadecane contact angle.

EXAMPLE 6

Into a flask were introduced 14.7 g of organosilane with the formula $C_4F_9CH_2CH_2Si(OMe)_3$, 1 g of tetramethoxysilane, 2.5 g of 2-(3,4-epoxycyclohexyl)ethyltrimethoxysilane, and 0.03 g of tetra-n-butyl titanate. This mixture was stirred at room temperature while dripping in a liquid mixture of 1.8 g of water and 10 g of methanol. After the completion of addition, stirring was continued overnight. The methanol was then stripped off under reduced pressure. The obtained reaction product was a fluorosilicone resin in the liquid state at room temperature. Fourteen grams of this fluorosilicone resin was dissolved in 16 g of tetrahydrofuran and 1.5 g of octafluoroadipic acid was mixed in. A transparent cured film was obtained by applying this liquid to the surface of an aluminum plate and heating for 1 hour at 150° C. The cured film had a 3H pencil hardness. The contact angle results were: 118 degrees for the water contact angle and 69 degrees for the n-hexadecane contact angle.

That which is claimed is:

1. A curable fluorosilicone resin composition comprising:
   (A) 100 parts by weight of a fluorosilicone resin obtained by cohydrolyzing a mixture of
      (a) 50 to 95 mole percent of a perfluoroalkyl-containing organosilane having the formula $R-CH_2CH_2SiX_3$,
      (b) 5 to 50 mole percent of an epoxy-containing organosilane having the formula $Z_wSiX_{4-w}$ and, optionally,
      (c) up to 50 mole percent of an organosilane having the formula $R^1_nSiX_{4-n}$,
   wherein R is a perfluoroalkyl group containing 4 to 15 carbon atoms, X is a hydrolyzable group, Z is an epoxy-containing monovalent organic group, $R^1$ is hydrogen or a monovalent hydrocabon group containing 1 to 15 carbon atoms, w is 1, 2 or 3 and n is 0, 1, 2 or 3; and
   (B) 1 to 50 parts by weight of a crosslinking agent selected from the group consisting of
      (i) an amino group-containing organosilicon compound that contains at least 2 nitrogen-bonded active hydrogens in each molecule and
      (ii) a fluorine compound that contains at least 2 carboxyl groups and at least 2 fluorine atoms in each molecule.

2. The curable resin composition according to claim 1, wherein X of each said organosilane (a), (b) and (c) is a methoxy radical and said crosslinking agent (B) is an amino group-containing organosilicon compound that contains at least 2 nitrogen-bonded active hydrogens in each molecule.

3. The curable resin composition according to claim 2, wherein Z of said epoxy-containing organosilane (b) is selected from the group consisting of 3-glycidoxypropyl, 2-(3,4-epoxycyclohexyl)ethyl, 3-(3,4-epoxycyclohexyl)propyl, and 3,4-epoxycyclohexyl groups.

4. The curable resin composition according to claim 3, wherein said amino group-containing organosilicon compound is selected from the group consisting of 3-aminopropyltriethoxysilane, 3-aminopropyltrimethoxysilane, 3-(2'-aminoethyl)aminopropyltrimethoxysilane, 3-(2'-aminoethyl)aminopropylmethyldimethoxysilane, 1,3-di(3'-aminopropyl)tetramethyldisiloxane, and 3-aminopropyldimethylsiloxy-endblocked polydimethylsiloxane.

5. The curable resin composition according to claim 4, wherein w of said epoxy-containing organosilane (b) is 1.

6. The curable resin composition according to claim 1, wherein X of each said organosilane (a), (b) and (c) is a methoxy radical and said crosslinking agent (B) is a fluorine compound that contains at least 2 carboxyl groups and at least 2 fluorine atoms in each molecule.

7. The curable resin composition according to claim 6, wherein Z of said epoxy-containing organosilane (b) is selected from the group consisting of 3-glycidoxypropyl, 2-(3,4-epoxycyclohexyl)ethyl, 3-(3,4-epoxycyclohexyl)propyl, and 3,4-epoxycyclohexyl groups.

8. The curable resin composition according to claim 3, wherein said fluorine compound is selected from the group consisting of tetrafluoroterephthalic acid, tetrafluorophthalic acid, tetrafluorosuccinic acid, octafluoroadipic acid and their anhydrides.

9. The curable resin composition according to claim 8, wherein w of said epoxy-containing organosilane (b) is 1.

* * * * *